INVENTOR
ALFRED V. PRICE

BY
Watson, Cole, Grindle & Watson
ATTORNEYS

United States Patent Office
3,057,478
Patented Oct. 9, 1962

3,057,478
APPARATUS FOR HANDLING LIQUIDS CONTAINING SOLID MATTER
Alfred Vernon Price, London, England, assignor to The Pulsometer Engineering Company Limited, London, England, a company of Great Britain
Filed June 22, 1960, Ser. No. 38,036
Claims priority, application Great Britain Oct. 9, 1959
6 Claims. (Cl. 210—108)

This invention relates to apparatus for handling liquid containing solid matter which may include components denser and less dense than the liquid.

It is an object of the invention provide an apparatus of simple construction which will enable such liquid to be conveyed by means of a pump, the liquid actually passing through the pump being substantially free of solid matter.

According to the invention apparatus for handling such liquid comprises an intercepting chamber which receives the liquid from an inlet pipe and the flow cross-section of which is much greater than that of the inlet pipe so that at the reduced flow velocity in this chamber liquid-borne solids which are denser than the liquid tend to settle out, a cover over part of the intercepting chamber for trapping buoyant solids rising in this part and defining between at least one edge thereof and at least one side wall of the intercepting chamber a passage through which liquid can flow upwardly out of the intercepting chamber and through a screen for trapping other buoyant solid matter into an outlet pipe leading to a storage receptacle, the cross-section of the said passage being much greater than that of the inlet pipe so that settled solid matter in the intercepting chamber near the said passage is not entrained by the outflowing liquid, and a pump with its inlet connected to the storage receptacle.

The cover may have at least one aperture covered by a screen through which liquid can rise into the outlet pipe but which traps buoyant matter rising beneath the cover.

Conveniently, the intercepting chamber is disposed in an upper portion of the storage receptacle.

The apparatus may be so arranged that the pump pumps liquid from the storage receptacle periodically and discharges it back through the intercepting chamber so that solid matter collected therein is carried away by the pumped liquid. In one such arrangement the outlet pipe communicates with the discharge side of the pump so that liquid flowing from the intercepting chamber to the storage receptacle flows through the pump in the reverse direction while the pump is inoperative. In an alternative arrangement, flow from the outlet pipe to the storage receptacle takes place through a valve-controlled by-pass passage which by-passes the pump, the valve controlling the by-pass passage being closed automatically when the pump begins to discharge liquid from the storage receptacle.

There may be a float-operated switch or the like which causes the pump to be brought into, or put out of, operation in accordance with the level of liquid in the storage receptacle.

The pump is preferably a centrifugal pump mounted with the eye of its impeller facing upwards, in which case a vent passage is preferably provided to vent air or other gas from the vicinity of the eye of the impeller.

The invention may be performed in various ways, and a specific embodiment, namely an apparatus for handling sewage, will now be described by way of example with reference to the accompanying drawings, in which.

Figure 1:
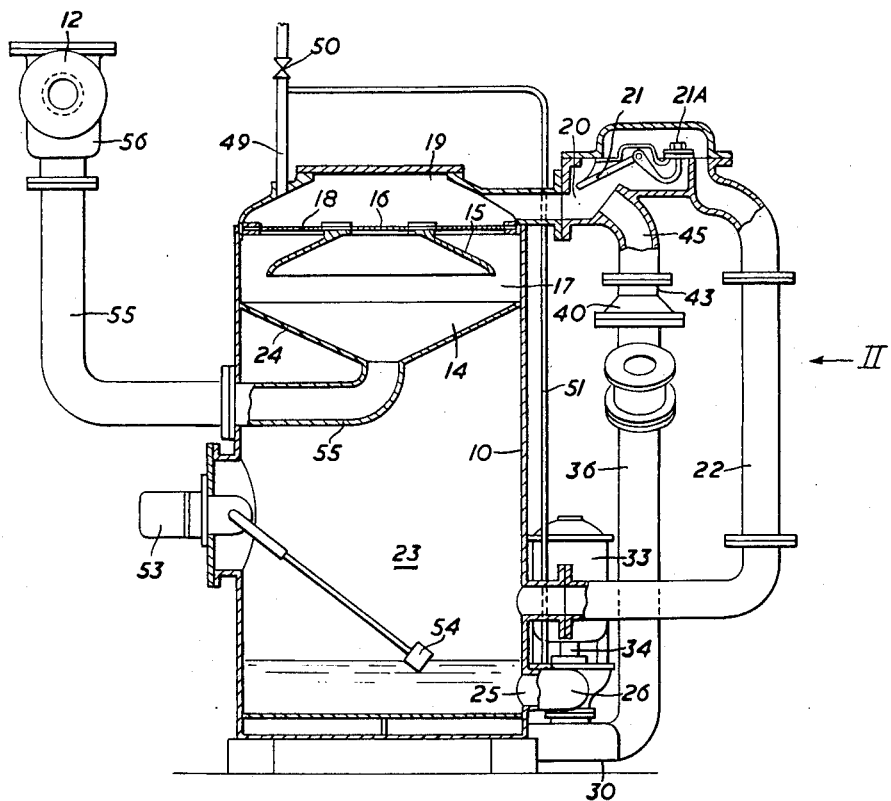
FIGURE 1 is a side view of the apparatus, partly in section.
Figure 2:
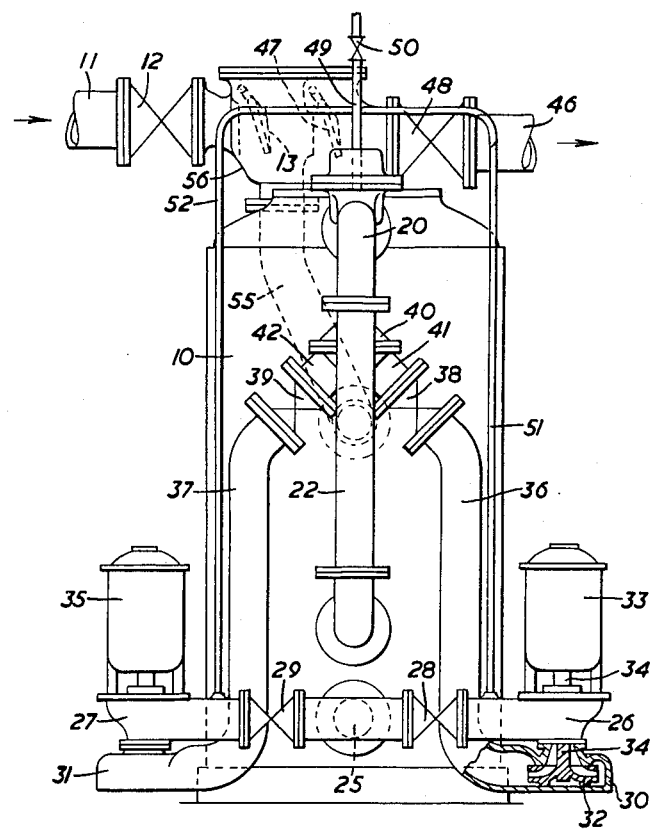
FIGURE 2 is a view looking in the direction of the arrow II in FIGURE 1.

The apparatus illustrated comprises a cylindrical vessel 10, which may be approximately six feet (about two metres) in height and three feet (about one meter) in diameter. An inlet pipe 11 fitted with a shut-off valve 12 and a non-return valve 13 admits the incoming liquid containing solid matter which may include components denser and less dense than the liquid, namely raw sewage, into a pipe 55 and thence into an intercepting chamber 14 formed in the upper part of the receptacle 10. The intercepting chamber has a sloping base 24, and the cross-sectional area of the intercepting chamber 14 increases rapidly from the pipe 55 to a maximum value equal to the internal cross-sectional area of the vessel 10, which is much greater than the cross-sectional area of the pipe 55, so that the average flow velocity of the liquid in the intercepting chamber 14 is much lower than its velocity in the pipe 55. At the top of the intercepting chamber 14 there is a cover 15 having a central aperture covered by a perforated screen or grid 16 and spaced from the walls of the vessel 10 by an annular passage 17. The cross-sectional area of this passage is also much greater than the cross-sectional area of the pipe 55. Across the upper part of the passage 17 there is an annular perforated screen or grid 18. Above the screens 16, 18 there is a space 19 from which leads an outlet pipe 20. In the outlet pipe 20 there is a pair of interconnected flap valves 21 and 21A which are normally in a position with valve 21 closing the mouth of a branch 45 at a junction thereof with outlet pipe 20, and with valve 21A in the open position so that the outlet pipe 20 communicates through valve 21A with a by-pass pipe 22 leading into the lower part 23 of the vessel. The valves 21 and 21A are normally held with valve 21A in the open position because the valve 21 is heavier than the valve 21A. The valves can also take up the converse positions with valve 21 open and valve 21A open and valve 21A closed as shown in FIGURE 1, in circumstances to be described below. The lower part 23 of the vessel constitutes a storage container.

Near the base of the vessel 10 there is a pipe 25 which divides into two pump inlet branches 26, 27 provided with shut-off valves 28, 29 respectively and leading respectively to centrifugal pumps 30, and 31. The pump 30 has an impeller 32, the eye of which faces upwardly and communicates with the inlet branch 26, the impeller being mechanically connected to an electric motor 33 by means of a shaft 34. The pump 31 is similarly constructed and is driven by an electric motor 35.

Figure 3:
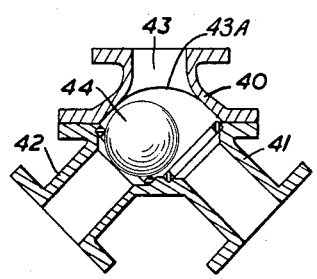
FIGURE 3 is a detail of a three-way valve.

The pump 30 delivers into a delivery pipe 36, and the pump 31 delivers into a delivery pipe 37. These delivery pipes are provided with shut-off valves 38 and 39 respectively, and communicate with a three-way valve 40 which is shown in more detail in FIGURE 3. The valve 40 is provided with an inlet branch 41 communicating with the pump delivery pipe 36 and an inlet branch 42 communicating with the pump delivery pipe 37. It also has an outlet branch 43. Within the three-way valve there is a ball 44 which can seat selectively on seatings at the upper ends of the inlet branches 41 and 42 or can occupy a central position, the arrangement being such that if the pump 30 is delivering while the pump 31 is idle the ball 44 occupies the position shown in FIGURE 3 so that the liquid delivered through the delivery pipe 36 and the inlet branch 41 cannot leak back into the storage receptacle 23 through the branch 42, the delivery pipe 37 and the pump 31. Conversely, if the pump 31 is delivering and the pump 30 is idle, the ball seats on the seating of the inlet branch 41. If both pumps are delivering the ball will occupy a central position in which all three branches of the valve 40 are open. The ball is prevented from seating in outlet branch 43 by a rib 43A.

The outlet branch 43 is connected to said branch 45 which is normally closed by the underside of the flap valve 21, this branch 45 communicating with the outlet pipe 20 only when the flap valves 21 and 21A are in the position shown in FIGURE 1 in which valve 21 is opened and valve 21A shuts off the outlet pipe 20 from the by-pass pipe 22.

Connected to the pipe 55 is a discharge pipe 46 equipped with a non-return outlet valve 47 and a shut-off valve 48. The non-return valves 13 and 47 are incorporated in the same casing 56.

Communicating with the space 19 at the top of the vessel 10 there is a vent pipe 49 equipped with a shut-off valve 50, while further vent pipes 51, 52 lead respectively from the top of the pump inlet branches 26 and 27 into the vent pipe 49 below the valve 50.

Mounted on one side of the vessel 10 is a motor switch 53 actuated by a float 54 within the storage receptacle.

The apparatus works as follows:

For filling the storage receptacle the pumps 30 and 31 are not running, the valves 12 and 13 are open, the flap valve 21A is in its open position, and sewage flows in through the pipes 11 and 55. The non-return valve 47 is closed since the relatively low pressure of the inflowing sewage is insufficient to open it. From the pipe 55 sewage rises slowly through the intercepting chamber 14, the velocity of flow being reduced to such an extent that solid matter which is denser than the liquid settles out on to the base 24 of the intercepting chamber. Solid matter which is buoyant rises and is trapped by the screen 16 or the screen 18, the majority being trapped by the screen 16 since the cover 15 extends over the major part of the area of the intercepting chamber. The liquid freed from solid matter which enters the space 19 passes through the pipe 20, valve 21A and the by-pass pipe 22 into the storage receptacle 23. As the level of the liquid rises in the storage receptacle the float 54 rises also. At a predetermined level the switch 53 will be operated to switch on the motors 33 and 35 to start the pumps. The pumps draw liquid from the storage receptacle and pump it through the delivery pipes 36 and 37 and through the three-way valve 40. The liquid pumped through the branch 43 and the branch 45 will swing over the flap valves 21 and 21A, thereby shutting off the by-pass pipe 22, and the liquid will pass back through the pipe 20 into the space 19. It will then pass down through the screens 16, 18, carrying with it buoyant solid matter trapped by these screens. Owing to its turbulence and deflection by the cover 15, the liquid will also entrain solid matter from the base 24 of the intercepting chamber 14. The liquid, carrying the solid matter with it, flows out through the pipe 55 into the pipe 46, its pressure opening the non-return outlet valve 47. The non-return inlet valve 13 will close so that liquid cannot flow back through the inlet pipe 11.

Two pumps are provided so that one can be shut down for maintenance or repair without having to shut down the whole apparatus, such pump being isolated by closing the shut-off valves 28, 38 or 29, 39, as the case may be. Should one of the pumps fail accidentally while not so isolated, the three-way valve 40 will operate to prevent leak-back through this pump.

Periodically the valve 50 is opened to vent trapped air or gas from the space 19 and from the pumps.

The apparatus shown can be simplified by omitting the flap valves 21, 21A and the by-pass pipe 22. In this case the liquid freed from solids will flow from the space 19 to the storage receptacle 23 through the branch 45, the three-way valve 40, one of the pump delivery pipes 36 or 37, in the reverse direction through one of the pumps 30 or 31, one of the branches 26 or 27, and the pipe 25.

The apparatus can be further simplified by having only one pump and associated piping, and by eliminating the three-way valve 40. In this case the apparatus must be shut down whenever the pump has to be taken out of service.

What I claim as my invention and desire to secure by Letters Patent is:

1. Apparatus for pumping liquid containing solid matter including components denser and less dense than said liquid, comprising side walls and a bottom wall defining an intercepting chamber, a inlet pipe for said liquid, the flow cross-section of said intercepting chamber between said side walls being substantially greater than the flow cross-section of said inlet pipe whereby at the reduced flow velocity in said intercepting chamber liquid-borne solid components which are denser than said liquid tend to settle out on said bottom wall, a cover over part of said intercepting chamber to trap buoyant components rising in this part of said intercepting chamber, said inlet pipe leading into said intercepting chamber below said cover, said cover having a peripheral edge spaced from said side walls to define a passage therebetween through which liquid can flow upwardly out of said intercepting chamber, a screen above said passage across the path of all the liquid flowing upwardly through said passage to trap buoyant matter rising through said passage, the flow cross-section of the said passage being substantially greater than said flow cross-section of said inlet pipe whereby said settled solid components are undisturbed by the said liquid flowing upwardly through said passage, a storage receptacle for said liquid freed from said components, an outlet pipe leading from above said screen to said storage receptacle, a pump having an inlet side and a discharge side, passage means connecting said pump inlet side to said storage receptacle, conduit means connecting said discharge side of said pump to said outlet pipe, a motor coupled to said pump for driving said pump, and switch means in the power circuit of said pump for putting said pump into and out of operation periodically to backwash said screen and said intercepting chamber with liquid from said storage receptacle and discharge from said intercepting chamber said liquid together with said components.

2. Apparatus according to claim 1 in which said cover has at least one aperture therein through which said liquid can rise from said intercepting chamber to said outlet pipe by-passing said passage between said cover and said side walls, and which has a screen covering said aperture in said cover to trap buoyant matter rising beneath said cover.

3. Apparatus according to claim 1 in which said intercepting chamber is disposed in an upper portion of said storage receptacle.

4. Apparatus according to claim 1 including a by-pass passage leading from said outlet pipe to said storage receptacle by-passing said pump, and a check valve disposed in the junction between said outlet pipe, said by-pass passage and said conduit means, said valve being responsive to the direction of flow of liquid for closing said by-pass passage when said pump is operative and for closing said conduit means and opening said by-pass passage when liquid is flowing from said intercepting chamber through said outlet pipe.

5. Apparatus according to claim 1 including means for operating said switch means to switch on said motor operative upon the attainment of a predetermined liquid level in said storage receptacle.

6. Apparatus according to claim 1 in which said pump in a centrifugal pump having an impeller with an upwardly facing inlet eye, and in which a vent passage is provided to vent gas from the vicinity of said eye of said impeller.

References Cited in the file of this patent

UNITED STATES PATENTS

| | | |
|---|---|---|
| 324,541 | Demarest | Aug. 18, 1885 |
| 2,358,841 | Walker | Sept. 26, 1944 |
| 2,675,350 | Robinson | Apr. 13, 1954 |
| 2,892,545 | Griffith | June 30, 1959 |